(12) United States Patent
Carver

(10) Patent No.: US 9,531,198 B2
(45) Date of Patent: Dec. 27, 2016

(54) HIGH PERMITTIVITY LOW LEAKAGE CAPACITOR AND ENERGY STORING DEVICE

(71) Applicant: Carver Scientific, Inc., Baton Rouge, LA (US)

(72) Inventor: David Reginald Carver, Baton Rouge, LA (US)

(73) Assignee: Carver Scientific, Inc., Baton Rouge, LA (US)

( * ) Notice: Subject to any disclaimer, the term of this patent is extended or adjusted under 35 U.S.C. 154(b) by 944 days.

(21) Appl. No.: 13/853,625

(22) Filed: Mar. 29, 2013

(65) Prior Publication Data

US 2013/0229157 A1 Sep. 5, 2013

Related U.S. Application Data

(62) Division of application No. 12/245,665, filed on Oct. 3, 2008, now Pat. No. 8,432,663.

(Continued)

(51) Int. Cl.
*H02J 7/00* (2006.01)
*H01G 4/04* (2006.01)
(Continued)

(52) U.S. Cl.
CPC . *H02J 7/00* (2013.01); *H01G 4/04* (2013.01); *H01G 4/08* (2013.01); *H01G 4/38* (2013.01); *H02J 7/345* (2013.01)

(58) Field of Classification Search
CPC ...................................................... H02J 7/345
(Continued)

(56) References Cited

U.S. PATENT DOCUMENTS 2,145,710 A 1/1939 Clark
2,778,762 A 1/1957 Eisler
(Continued)

FOREIGN PATENT DOCUMENTS

EP 1 251 530 10/2002
EP 1 786 006 5/2007
(Continued)

OTHER PUBLICATIONS

International Search Report and Written Opinion from International application No. PCT/US2008/078808, dated Feb. 25, 2009, (4 pages).

(Continued)

*Primary Examiner* — Richard Isla Rodas
*Assistant Examiner* — Johali Torres Ruiz
(74) *Attorney, Agent, or Firm* — Klarquist Sparkman, LLP

(57) ABSTRACT

A method is provided for making a high permittivity dielectric material for use in capacitors. Several high permittivity materials in an organic nonconductive media with enhanced properties and methods for making the same are disclosed. A general method for the formation of thin films of some particular dielectric material is disclosed, wherein the use of organic polymers, shellac, silicone oil, and/or zein formulations are utilized to produce low conductivity dielectric coatings. Additionally, a method whereby the formation of certain transition metal salts as salt or oxide matrices is demonstrated at low temperatures utilizing mild reducing agents. Further, a circuit structure and associated method of operation for the recovery and regeneration of the leakage current from the long-term storage capacitors is provided in order to enhance the manufacturing yield and utility performance of such devices.

12 Claims, 7 Drawing Sheets

STATE A

Related U.S. Application Data

(60) Provisional application No. 60/978,067, filed on Oct. 5, 2007.

(51) Int. Cl.
  *H01G 4/38* (2006.01)
  *H02J 7/34* (2006.01)
  *H01G 4/08* (2006.01)

(58) Field of Classification Search
  USPC .................................................... 320/166
  See application file for complete search history.

(56) References Cited

U.S. PATENT DOCUMENTS

| | | | |
|---|---|---|---|
| 2,798,990 | A | 7/1957 | Davis |
| 3,288,728 | A | 11/1966 | Gorham |
| 3,342,754 | A | 9/1967 | Gorham |
| 3,616,314 | A | 10/1971 | Settineri et al. |
| 3,907,748 | A | 9/1975 | Marvel et al. |
| 4,333,418 | A | 6/1982 | Nagel et al. |
| 4,359,327 | A | 11/1982 | Armand et al. |
| 4,500,562 | A | 2/1985 | Jahn et al. |
| 4,532,369 | A | 7/1985 | Hartner |
| 4,638,407 | A | 1/1987 | Lundsgaard |
| 4,675,462 | A | 6/1987 | Ungarelli et al. |
| 4,734,533 | A | 3/1988 | Ungarelli et al. |
| 4,748,542 | A | 5/1988 | Lundsgaard |
| 4,769,505 | A | 9/1988 | Lee et al. |
| 4,795,838 | A | 1/1989 | Bornengo et al. |
| 4,806,702 | A | 2/1989 | Lee et al. |
| 4,816,608 | A | 3/1989 | Bornengo et al. |
| 4,849,559 | A | 7/1989 | Lee et al. |
| 4,853,488 | A | 8/1989 | Ungarelli et al. |
| 4,886,923 | A | 12/1989 | Ungarelli et al. |
| 4,942,061 | A | 7/1990 | Domes |
| 4,963,429 | A | 10/1990 | Norian et al. |
| 5,079,674 | A | 1/1992 | Malaspina |
| 5,110,903 | A | 5/1992 | Lee et al. |
| 5,144,529 | A | 9/1992 | Takahashi |
| 5,266,291 | A | 11/1993 | Drnevich et al. |
| 5,305,178 | A | 4/1994 | Binder et al. |
| 5,636,100 | A | 6/1997 | Zheng et al. |
| 5,783,933 | A | 7/1998 | Bailly |
| 6,096,234 | A | 8/2000 | Nakanishi |
| 6,307,735 | B1 | 10/2001 | Saito |
| 6,602,741 | B1 | 8/2003 | Kudoh et al. |
| 6,674,635 | B1 | 1/2004 | Fife et al. |
| 6,956,417 | B2* | 10/2005 | Bernstein ............... H03L 7/093 327/157 |
| 7,033,406 | B2 | 4/2006 | Weir et al. |
| 7,164,197 | B2 | 1/2007 | Mao et al. |
| 7,170,260 | B2 | 1/2007 | Thrap |
| 7,190,016 | B2 | 3/2007 | Cahalen et al. |
| 7,197,360 | B1* | 3/2007 | Moulder ............... A61N 1/3956 607/5 |
| 7,279,777 | B2 | 10/2007 | Bai et al. |
| 7,342,755 | B1 | 3/2008 | Horvat et al. |
| 7,429,317 | B2 | 9/2008 | Paul |
| 7,495,887 | B2 | 2/2009 | Cox |
| 7,542,265 | B2 | 6/2009 | Tan et al. |
| 7,781,358 | B2 | 8/2010 | Hackenberger et al. |
| 8,164,881 | B2 | 4/2012 | Hu et al. |
| 8,289,676 | B2 | 10/2012 | Giannantonio et al. |
| 8,382,042 | B2 | 2/2013 | Sanderson et al. |
| 8,432,663 | B2 | 4/2013 | Carver |
| 8,633,289 | B2 | 1/2014 | Carver et al. |
| 8,940,850 | B2 | 1/2015 | Carver et al. |
| 9,011,627 | B2 | 4/2015 | Carver |
| 9,087,645 | B2 | 7/2015 | Holme et al. |
| 2002/0147477 | A1* | 10/2002 | Pons ............... A61N 1/3712 607/27 |
| 2004/0210289 | A1 | 10/2004 | Wang et al. |
| 2005/0029515 | A1 | 2/2005 | Nagai et al. |
| 2005/0110535 | A1* | 5/2005 | Bernstein ............... H03L 7/093 327/156 |
| 2005/0168292 | A1* | 8/2005 | Frans ............... H03L 7/0812 331/16 |
| 2006/0034035 | A1 | 2/2006 | Maruo |
| 2006/0065045 | A1 | 3/2006 | Borwick, III et al. |
| 2006/0074164 | A1 | 4/2006 | Slenes et al. |
| 2006/0182973 | A1 | 8/2006 | Lee et al. |
| 2006/0191443 | A1 | 8/2006 | Yamaguchi et al. |
| 2007/0108490 | A1 | 5/2007 | Tan et al. |
| 2007/0117886 | A1 | 5/2007 | Tan et al. |
| 2008/0171230 | A1 | 7/2008 | Zou et al. |
| 2008/0180876 | A1 | 7/2008 | Shimanouchi et al. |
| 2008/0293864 | A1 | 11/2008 | Tan et al. |
| 2009/0090999 | A1 | 4/2009 | Carver |
| 2009/0312474 | A1 | 12/2009 | Tan et al. |
| 2010/0002362 | A1 | 1/2010 | Clelland et al. |
| 2010/0033899 | A1 | 2/2010 | Koh et al. |
| 2010/0079926 | A1 | 4/2010 | Tan et al. |
| 2010/0302707 | A1 | 12/2010 | Tan et al. |
| 2012/0127122 | A1 | 5/2012 | Lim |
| 2012/0241085 | A1 | 9/2012 | Carver |
| 2013/0194716 | A1 | 8/2013 | Holme et al. |
| 2013/0224397 | A1 | 8/2013 | Carver |
| 2014/0295101 | A1 | 10/2014 | Carver |
| 2015/0000090 | A1 | 1/2015 | Carver et al. |
| 2015/0000833 | A1 | 1/2015 | Carver et al. |
| 2015/0017342 | A1 | 1/2015 | Carver et al. |
| 2015/0131198 | A1 | 5/2015 | Carver et al. |
| 2015/0131205 | A1 | 5/2015 | Amaratunga et al. |
| 2015/0206658 | A1 | 7/2015 | Carver |
| 2015/0206659 | A1 | 7/2015 | Carver |
| 2015/0235768 | A1 | 8/2015 | Holme et al. |
| 2015/0235769 | A1 | 8/2015 | Carver |

FOREIGN PATENT DOCUMENTS

| | | |
|---|---|---|
| EP | 2 264 727 | 12/2010 |
| GB | 811295 | 4/1959 |
| JP | 54145000 A | 11/1979 |
| JP | 2003-011270 | 1/2003 |
| JP | 2007-106875 A | 4/2007 |
| WO | WO2009/046341 A1 | 4/2009 |
| WO | WO2014/035456 A2 | 3/2014 |
| WO | WO2014/074122 A2 | 5/2014 |
| WO | WO2014/161007 A2 | 10/2014 |

OTHER PUBLICATIONS

Ihn, et al. "Dielectric Functions of $Cd_{(1-x)}Mg_{(x)}Te$ Alloy Films by Using Spectroscopic Ellipsometry," *Journal of Korean Physical Society*, 43(4): 634-637, Oct. 2003.

Ihn et al., Parametric modeling of the dielectric functions of $Cd_{1-x}Mg_xTe$ alloy films, *Thin Solid Films*, 455-456 (2004) 222-227, May 1, 2004.

Office Action (with English-language translation) from the State Intellectual Property Office of the People's Republic of China for Appl. No. CN 200880119265.6, issued Jul. 20, 2011 (9 pages).

Office Action (with English-language translation) from the State Intellectual Property Office of the People's Republic of China for Application. No. CN 200880119265.6, issued May 11, 2012 (18 pages).

Notification of the Decision of Rejection (with English-language translation) from the State Intellectual Property Office of the People's Republic of China for Application. No. CN 200880119265.6, issued Feb. 5, 2013 (20 pages).

Notification of Reexamination (with English-language translation) from the State Intellectual Property Office of the People's Republic of China for Application. No. CN 200880119265.6, issued Nov. 15, 2014 (19 pages).

Office action (with English-language translation) from the Japanese Patent Office for Application. No. 2010-528177, issued Nov. 19, 2012 (9 pages).

Definition for dielectric materials: http://whatis.techtarget.com/definition/dielectric-material (downloaded Jul. 28, 2014).

(56) References Cited

OTHER PUBLICATIONS

Extended European Search Report issued for European Application No. 08835074.9 (mailed Jul. 4, 2016).
Final Office Action from the U.S. Patent and Trademark Office for U.S. Appl. No. 12/245,665 (mailed Aug. 15, 2012).
*Modern Cyclophane Chemistry*, Eds. Gleiter et al., John Wiley, pp. 211-217 (2004).
Office Action from the U.S. Patent and Trademark Office for U.S. Appl. No. 12/245,665 (mailed Dec. 7, 2011).
Restriction Requirement from the U.S. Patent and Trademark Office for U.S. Appl. No. 12/245,665 (mailed Sep. 13, 2011).

* cited by examiner

STATE A

STATE B

STATE C

STATE D

HIGH PERMITTIVITY LOW LEAKAGE CAPACITOR AND ENERGY STORING DEVICE

RELATED APPLICATION

This application is a divisional application and claims the benefit of priority of U.S. Nonprovisional application Ser. No. 12/245,665 filed 3 Oct. 2008, which is a nonprovisional of and claims the benefit of and priority to U.S. Provisional Application 60/978,067, filed 3 Oct. 2007, the entire contents of which are incorporated herein by this reference and made a part hereof.

FIELD OF THE INVENTION

This disclosure relates generally to capacitors and storage devices. More specifically, this disclosure relates a high permittivity low leakage capacitor and energy storing device, and methods for forming the same.

BACKGROUND

In embodiments described herein, the following understanding of the nomenclature used in describing the present High Capacity Energy Storage Capacitors should be understood and considered. In older literature, the term "dielectric constant" of a material is used to describe the polarization ability or "permittivity" of the material when placed in an electric field. The term "dielectric breakdown" was used to describe the voltage at which an insulator material would "breakdown" and conduct current. This dielectric breakdown voltage is also known as the dielectric strength. Since the abbreviated version for both of these terms is "dielectric," and the material itself is called the dielectric, there was some confusion in the literature as to what was being discussed. Thus, the term "permittivity" is now used (mostly) to describe the ability of a material to charge polarize and change the "dielectric constant" of its volume of space to a higher value from that of a vacuum. Dielectric breakdown voltage is sometimes used to indicate the dielectric strength of the material.

The relative permittivity of a material is simply the measurement of its static dielectric constant divided by the dielectric constant of vacuum.

$$e_r = \frac{e_s}{e_0}$$

where:
$e_r$=relative permittivity
$e_s$=measured permittivity
$e_o$=electrical permittivity of vacuum (8.8542 E-12 F/m)

Thus, when the term good dielectric is used, this is meant (usually) to mean a material that displays good electrical insulation characteristics such as a high breakdown voltage and a low conductivity. A material that has a good "dielectric constant" for a capacitor means it has a good "permittivity" (high value) and increases the capacitance of a given size capacitor when placed between the electrodes by a "good" (high) amount.

A capacitor is formed when two conducting plates are separated by a non-conducting media, called the dielectric. The value of the capacitance depends on the size of the plates, the distance between the plates and the properties of the dielectric. The relationship is:

$$C = \frac{e_0 \cdot e_r A}{d}$$

$e_o$=electrical permittivity of vacuum (8.8542 E-12 F/m)
$e_r$=relative permittivity
A=surface of one plate (both the same size)
d=distances between two plates Whereas the electrical permittivity of a vacuum is a physical constant, the relative electrical permittivity depends on the material.

Typical Relative Electrical Permittivities

| Material | $e_r$ |
|---|---|
| Vacuum | 1 |
| Water | 80.1 (20° C.) |
| Organic Coating | 4-8 |

A large difference is noticed between the electrical permittivity of water and that of an organic coating.

Relative Static Permittivities of Some Materials at Room Temperature

| Material | Dielectric |
|---|---|
| Vacuum | 1 (by definition) |
| Air | 1.00054 |
| Polytetrafluoroethylene | 2.1 |
| Polyethylene | 2.25 |
| Polystyrene | 2.4-2.7 |
| Paper | 3.5 |
| Silicon dioxide | 3.7 |
| Concrete | 4.5 |
| Pyrex (glass) | 4.7 (3.7-10) |
| Rubber | 7 |
| Diamond | 5.5-10 |
| Salt | 3-15 |
| Graphite | 15-Oct |
| Silicon | 11.68 |
| Methanol | 30 |
| Furfural | 42 |
| Glycerol | 47-68 |
| Water | 88-80.1-55.3-34.5 |
| Hydrofluoric acid | 83.6 (0° C.) |
| Formamide | 84.0 (20° C.) |
| Sulfuric acid | 84-100 (20-25° C.) |
| Hydrogen peroxide | 128 aq-60 (−30-25° C.) |
| Hydrocyanic acid | 158.0-2.3 (0-21° C.) |
| Titanium dioxide | 86-173 |
| Strontium titanate | 310 |
| Barium strontium | 15 nc-500 |
| Barium titanate | 90 nc-1250-10,000 |
| (LaNb):(ZrTi)PbO3 | 500, 6000 |

It is interesting to note that materials which have large dipole moments and high permittivity are often conductive salts or very polar inorganic acids or bases. In these cases their liquid form is difficult to use and/or toxic or corrosive. This makes their utility difficult and dangerous. Often the polar salts display undesirable conductivity when they are slightly impure and/or exposed to atmospheric conditions with humidity.

The inorganic salts which display nonconductive behavior and very high permittivities are inorganic salts of the transition metals and other inorganic salts that display high permittivities due to their crystal lattice structures. Use of these materials are difficult due to their crystalline nature. Much effort has been expended to make these types of material more manufacturable through the use of thin coatings and methods of high temperature fusing and sintering.

SUMMARY OF THE INVENTION

According to one or more features of the disclosure, a method is provided for making a high permittivity dielectric material for use in capacitors. Several high permittivity materials in an organic nonconductive media with enhanced properties and methods for making the same are disclosed.

According to one or more features of the disclosure, a general method for the formation of thin films of some particular dielectric material is disclosed, wherein the use of organic polymers, shellac, silicone oil, and/or zein formulations are utilized to produce low conductivity dielectric coatings. Additionally, in accordance with one or more features of the disclosure, a method whereby the formation of certain transition metal salts as salt or oxide matrices is demonstrated at low temperatures utilizing mild reducing agents.

Additionally, in accordance with one or more features of the disclosure, a circuit structure and associated method of operation for the recovery and regeneration of the leakage current from the long-term storage capacitors is provided in order to enhance the manufacturing yield and utility performance of such devices.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which.

DETAILED DESCRIPTION

Figure 1:
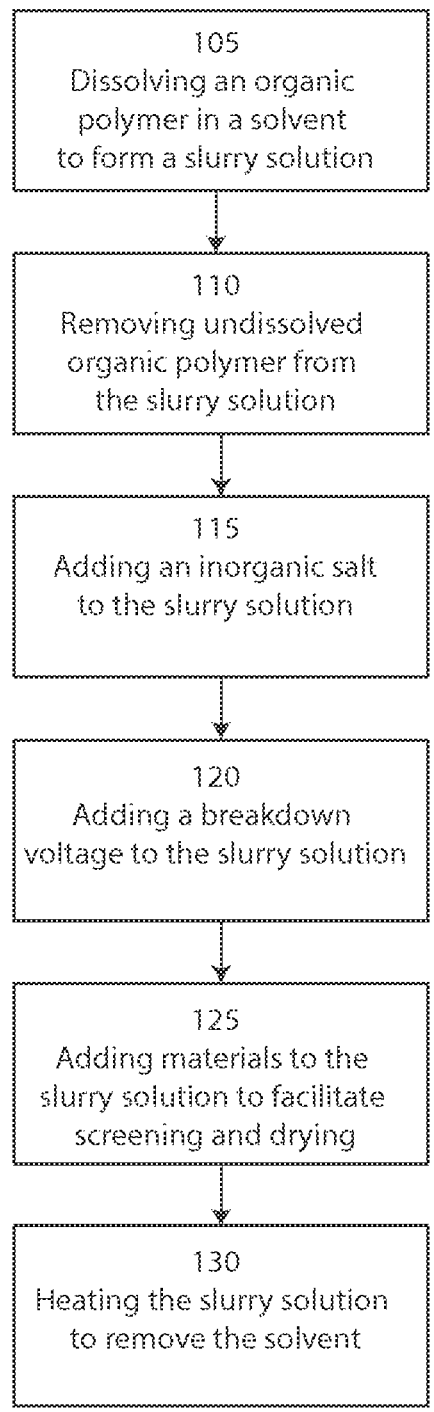
FIG. 1 is an exemplary flow chart illustrating a method for making a high permittivity dielectric material, according to an embodiment of the present disclosure.

The present disclosure is directed to a method of forming a high permittivity low leakage capacitor and energy storing device.

In one or more embodiments, the methods, materials and devices described in the present disclosure reduce the difficulties associated with the manufacture of high permittivity materials, decrease the difficulty of incorporation of these materials into devices, increase the performance of the materials, and show a method whereby the materials performance may be enhanced through the use of external electronic components to increase the reliability and longevity of the device. A result of these improvements will be a decrease in the rejection ratio of such devices when manufactured and also to improve the long term reliability of the devices when in actual use. Also, the use of the methods set forth in the present disclosure will also reduce the manufacturing costs of the materials and devices and aid in the reduction of waste byproducts that would otherwise go unused for such applications.

When considering capacitors and their relationships to energy, to determine the work that must be done to charge a capacitor (i.e. the potential energy=E), the work performed is equal to the potential energy stored in the capacitor. The work performed to transfer a given amount of charge into a given capacitance is given by the following formula:

$$W = \frac{q^2}{C \cdot 2}$$

where the relationship between capacitance and charge is:
q=C·V
where q=charge (coulombs)
C=capacitance (Farads)
V=electric potential (volts).
Thus, substitution for q in the work equation above provides, $$E = W = \frac{C \cdot V^2}{2}$$

where E is the energy stored in the capacitor and is equal to the work that was performed to store the charge on the capacitor.

Thus, it should be noted that the energy stored in a capacitor is related to the square of the voltage applied to the capacitor.

In one or more embodiments, it is therefore important that the voltage rating for the capacitor be as high as possible when energy storage is the primary use for the device. In one or more embodiments, besides having a high break down voltage, the capacitor also possesses a low leakage current. In other words, when the capacitor has been charged to a given voltage, the rate of charge conduction from one electrode to the other should be a relatively small value. When the capacitor is charged for energy storage over some given period of time, the rate of leakage is an acceptably low enough value that would vary depending on the use of the storage device (how long is it stored) and the "value" of the energy thus stored (how easy is it to recharge and the cost of the charge). An acceptable value for leakage would typically vary greatly from application to application. In all embodiments, leakage is something that is generally avoided and minimized.

In one or more embodiments, the highest value of relative permittivity and the highest voltage rating possible for a given level of leakage provides the best capacitor when evaluated for most energy storage applications. It should also be noted that the ability of the capacitor to "absorb" charge at a reasonable rate is also an important factor. For most electronic applications the ability of a capacitor to act as an ideal capacitor is an important parameter, especially when working at frequencies in the MHz and above. The capacitor should also have the ability to fully discharge the charge that has been placed into its electrodes. All capacitive device suffer from "irreversible dielectric absorption", but in the field of energy, discharging a capacitor to a certain level that is determined by its application will place a limit on how much of this effect is acceptable.

In one or more embodiments, substantial improvements in the voltage rating, leakage current, and dielectric of an energy storage capacitor are provided. The scope of the improvements are generally described herein as they relate to the field of energy storage, but the methods and devices described herein can further be applied to general applications wherein such improvements can be utilized to make a device that displays enhanced characteristics, including better frequency response and reduced dielectric absorption in other applications for the materials and device described herein.

In one or more embodiments, a high permittivity low leakage capacitor and energy storage device is described having the following improved characteristics:
1) High voltage rating (High break-down voltage),
2) High relative permittivities,
3) Low leakage current at maximum voltage charge,
4) Small size and weight,
5) Safe use due to low toxicity and other hazards,
6) Easy and better manufacturing procedures,
7) Environmentally friendly manufacturing,
8) High rate of discharge and charge, and
9) Ability to fully discharge.

It should be noted that previously known high permittivity materials have been subject to aging and brittleness, thereby providing substantial difficulty in forming such materials into the required shapes for their various uses. Further, since several of these previously known high permittivity materials are toxic, conventional machining and forming steps are deemed undesirable in a normal work environment. Due to their mechanical instability, the previously known high permittivity materials were also prone to electrical fatigue and mechanical fatigue when subjected to repeated electrical activations. Also, previously known high permittivity materials needed to be protected from the environmental changes, such as humidity changes, that can lead to microfractures in the material and subsequent electrical failures. There was also a need to form previously known high permittivity materials at high temperatures. Due to their somewhat complex crystalline structures and need to be formed at high temperature, it has traditionally been difficult to make high permittivity materials into thin films. Often the crystal structures were poorly formed and the thin films showed reduced permittivities as thin films versus their bulk property.

To alleviate these mechanical and electrical problems, in one or more embodiments, a permittivity material is provided that is mechanically ground and dispersed into an organic polymer for low temperature processing (i.e., temperature processing below approximately 500° C.). In different embodiments described herein, a variety of materials are described as being mixed and suspended in various polymers that possess the desired enhanced characteristics. In one or more embodiments, shellac and zein are found to offer enhanced properties for this application. In the case of both of these materials, the water and alcohol solubility of the polymer precursors provide desirable properties.

In one or more embodiments, using the mechanically ground dielectrics, the suspension of the permittivity of the dielectric in the organic binder was enhanced by approximately 25% in shellac and zein over their dry particulate forms.

In one or more embodiments, an in situ formation of the dielectric was also performed to produce unique dielectrics possessing unique characteristics. In these embodiments, the addition of $NaBH_4$ in an alcoholic solution of zein was used to produce and enhance the functionality of the mixture. The resulting mixture, when treated with concentrated ammonium hydroxide and then heated, produces greatly enhanced dielectric material with permittivity increases on the order of 250% based on their change in permittivity from their simply being mixed with the organic binders. While even greater optimization may be achieved with further experimentation, the viability of the procedure and its substantial utility have been shown by the resulting properties of such a mixture.

In one or more embodiments, the dielectric compounds when suitably ground may alternatively be mixed with silicone oil and a small amount of borax or sodium borohydride. When heated to 150° C., similar results of increases up to 250% as when the organic polymer suspensions were used.

In both of the above-described embodiments, when the mixtures were placed between two electrodes in a capacitor arrangements, the use of either the shellac, zein, or silicone oil polymers resulted in undetectable leakage currents when the voltage between the electrodes was raised to 300V. To the contrary, when dielectric material such as barium titanate was ground and pressed in between the electrodes, it showed unacceptable leakage currents when tested.

The following representative embodiments will set forth specific examples of methods of making a high permittivity material in accordance with the present disclosure. It is understood that the disclosure need not be limited to the disclosed embodiments but it is intended to cover various modifications thereof, including combinations of the steps and components of the various examples.

Procedures:

I. Procedure for Making a Reduced Leakage Current Dielectric for Use in a Capacitor or Energy Storage Device.

In one or more embodiments, 1.5 g of zein is added to 15 mL of ethanol. A small amount of water is added or optionally the solution is filtered or centrifuged to remove any undissolved particulate matter. The resulting clear solution is then treated with 0.5 g to 15 grams of high permittivity inorganic salt such as barium titanate powder that has been previously treated to be made into a nano powder or other fine dispersion material. The resulting slurry is then mixed thoroughly and screened or otherwise spread on the target electrode. Addition of a small amount of DMSO (Dimethylsulfoxide) or DMF (dimethyl formamide) will facilitate the screening and drying process. The "green sheet" material may then be dried at low temperature or alternatively clamped or otherwise pressed in contact with the other plate electrode. Elevated drying temperatures of not over approximately 60° C. (as excessive temperature can lead to bubble formation and cavitation of the film) are then maintained until all solvents have been removed. Further heating at 150° C. can be performed.

II. Procedure for Making a High Permittivity Dielectric Utilizing Low Temperature Methods In one or more embodiments, 0.75 g of strontium II carbonate is added to a stirred solution of 1.5 g gadolinium III carbonate in 15 mL of DI water. After dissolution of the two compounds takes place, a solution of 200 mg of zein (or other organic polymer) in 2 mL of water with 200 mG of sodium borohydride is added dropwise to the metal solution with good stirring. The organic polymer material is optional if the dielectric material is to be formed or isolated without binder. A small amount of acetic acid may be added to facilitate the reduction. After 5 minutes 5 mL of concentrated ammonium hydroxide is added. After 5 more minutes, the solution may be filtered and then screened, spread, or spun coated onto the desired electrode material and evaporated and treated as described in Procedure I. Or the solution can be evaporated to isolated the dielectric material as a solid.

III. Procedure for Reducing the Leakage Current in a Dielectric that has a Small Amount of Conductivity In one or more embodiments, 1.5 G of Zein is dissolved in 15 mL of ethanol. A 5 to 50 mL slurry of the desired dielectric material is then treated with the zein solution with good agitation. The slurry may then be spread, screened, or spun coated onto the electrode and treated as described in procedure I to produce a device.

IV. Procedure for Reducing the Leakage Current Utilizing Shellac and a High Permittivity Material In one or more embodiments, to a 1.5 G sample of the high permittivity material as produced by a procedure herein wherein the dielectric is isolated as a solid powder or in liquid form is added 1.5 G of commercial grade shellac solution that has been filtered or centrifuged to remove particulate matter. Additional ethanol can be added as needed to make the material into a workable slurry or solution. The resulting liquefied material can then be spread, screened or spun coated onto the electrode material as noted in procedure I.

V. Procedure for the use of Silicone Oil and a Dielectric Material as a Capacitor In one or more embodiments, 1.0 G of silicone oil is added to a finely ground high permittivity dielectric of weight from 0 to 5 G. The mixture is well stirred and a small amount of sodium borohydride or borax salt (0 to 500 mg) is added to the slurry or solution. If the solution or mixture is workable, it can then be spread, screened, or spun, onto an electrode. The sheet can then be heated to approximately 150° C. to 300° C. for a few minutes to facilitate the increase in viscosity of the silicone oil. The top electrode can then be pressed or otherwise fastened with pressure to the silicone formed electrode and then heat treated for a period of time sufficient to fully stabilize the dielectric material. For example, approximately three hours at 150 to 200° C. is sufficient, although less time and different temperatures may be acceptable.

FIG. 1 is an exemplary flow chart illustrating a method for making a high permittivity dielectric material, according to an embodiment of the present disclosure. The method begins by dissolving an organic polymer in a solvent to form a slurry solution (105). The solvent may be shellac, silicone oil and/or zein. In one embodiment, the undissolved organic polymer is removed from the slurry solution (110), for example, using a filter or centrifuge. An inorganic salt may then be added to the slurry solution (115). The inorganic salt may be a transition metal salt, such as a Gd, Sr, Sn, and/or Fe salt. In one embodiment, a breakdown voltage adjuvant may be added to the slurry solution (120). The breakdown voltage adjuvant may include one or more of Y, Ni, Sm, Sc, Tb, Yb, La, Te, Ti, Zr, Ge, Mg, Pb, Hf, Cu, Ta, Nb, and/or Bi. To facilitate screening and drying, a dimethyl formamide and a dimethylsulfoxide may be added to the slurry solution (125). The slurry solution may then be heated to a temperature of about 150° C. to about 300° C. to remove or evaporate the solvent (130).

Referring now to FIGS. 2A-2D, a multi-state electrical circuit diagram is illustrated in various states in accordance with one or more embodiments for making an electronic device for the recovery of leakage current from an energy storage capacitor. FIGS. 2A-2D illustrates four states a novel circuit that has been developed to regenerate and recycle the leakage current from a capacitor or capacitor array, C1.

In FIGS. 2A-2D, the following components are described. C1 is a capacitor or capacitor array that is capable of storing a certain amount of charge. It displays a leakage of current when subjected to a given voltage (V+). C2 is a capacitor (e.g., much smaller than C1) of good characteristics that displays a much lower leakage current (or could be the same leakage current, but of much smaller area of capacitance). D1 is a diode that has the characteristic of being able to "block" the voltage from C1 from returning to Vss. When the voltage output from T1's secondary exceeds the voltage present on C1 and the forward voltage drop of D1, then current will conduct to the C1 capacitor(s).

S1 is switch that is able to electrically connect the high voltage side of C1 to the charging voltage, V+. In one position it is connected to V+ and in the other position it is an open connection or connected to the load. S2 and S3 are electrically controlled switches that have the ability to switch between two different outputs. These switches do not necessarily need to be high voltage switches able to withstand V+. T1 is a "flyback" type of transformer or an equivalent inductor that has the capability of withstanding a voltage on the secondary winding that is as great or greater than V+. V+ is a charging voltage that is connected to the main energy storage capacitor(s) C1 during the charge cycle. Vss is the lower voltage that is present on the opposite electrode of C1 from V+ that produces the potential difference between the two.

Figure 2A:
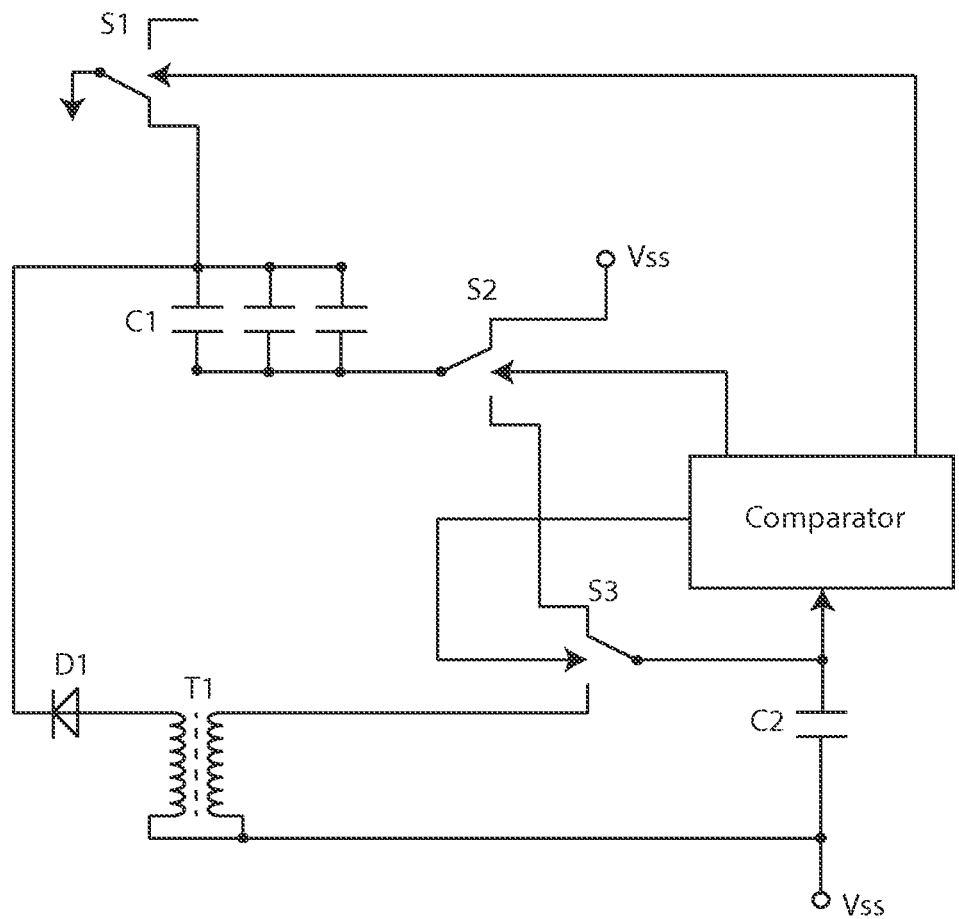
FIG. 2A illustrates a multi-state electrical circuit diagram in accordance with one or more embodiments of the present disclosure for the recovery of leakage current from an energy storage capacitor.
Figure 2B:
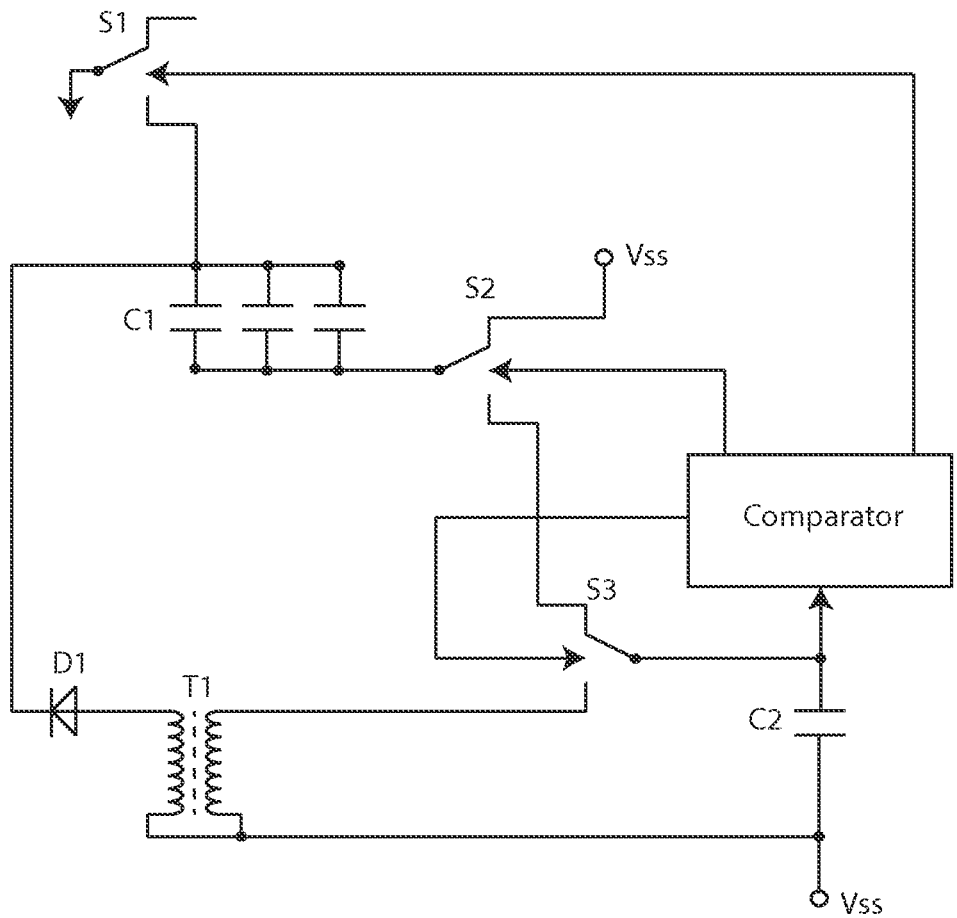
FIG. 2B illustrates a multi-state electrical circuit diagram in accordance with one or more embodiments of the present disclosure for the recovery of leakage current from an energy storage capacitor.
Figure 2C:
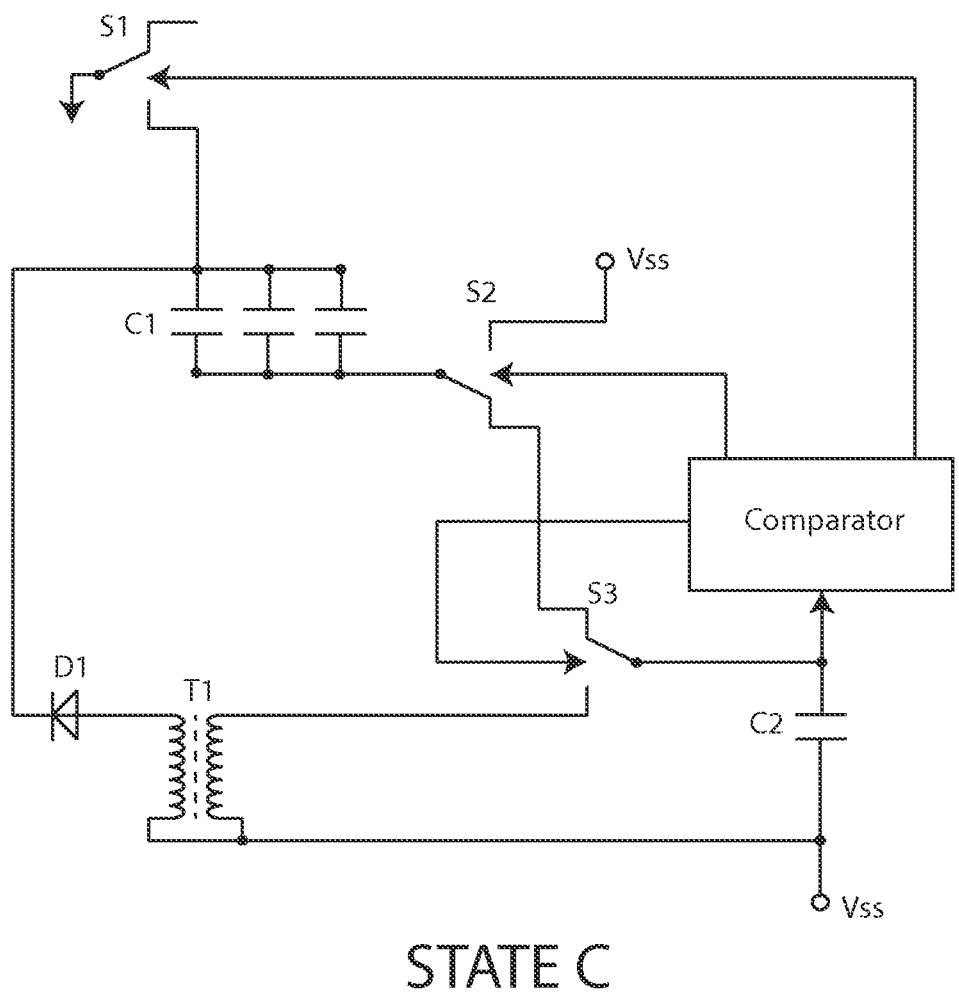
FIG. 2C illustrates a multi-state electrical circuit diagram in accordance with one or more embodiments of the present disclosure for the recovery of leakage current from an energy storage capacitor.
Figure 2D:
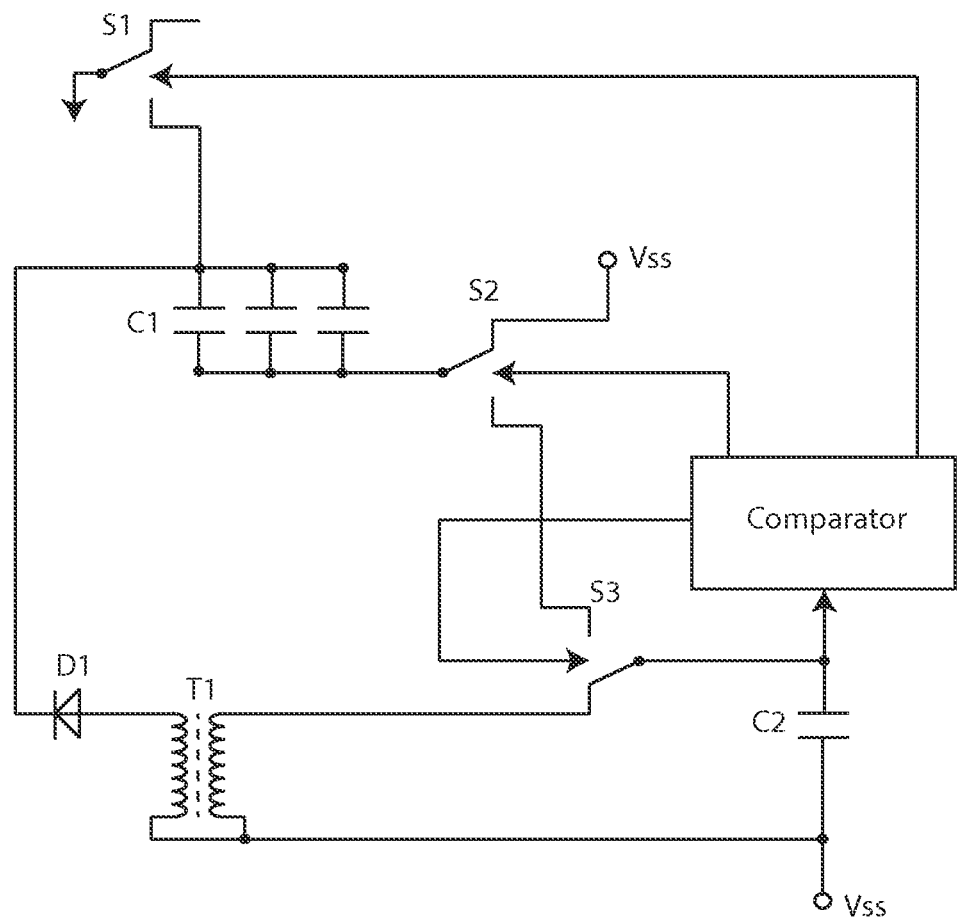
FIG. 2D illustrates a multi-state electrical circuit diagram in accordance with one or more embodiments of the present disclosure for the recovery of leakage current from an energy storage capacitor.
Figure 3:
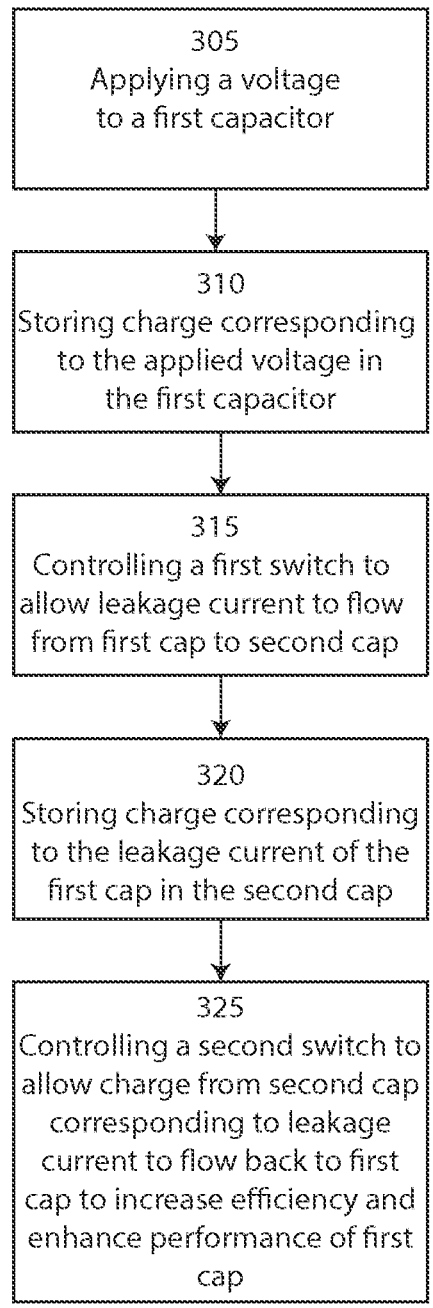
FIG. 3 is an exemplary flow chart illustrating a method for recovery and regeneration of a leakage current from a capacitor using the multi-state electrical circuit of FIGS. 2A-D, according to an embodiment of the present disclosure.

FIG. 3 is an exemplary flow chart illustrating a method for recovery and regeneration of a leakage current from capacitor C1 using the multi-state electrical circuit of FIGS. 2A-2D, according to an embodiment of the present disclosure. Referring to State A of the circuit diagram of FIG. 2A, a current is shown flowing from V+ source through S1 to the positive plate of C1 (305). In this situation S2 is connected to Vss so that the charge can be accumulated on C1 to the potential difference between the two (310). The status of S3 does not matter at this state and no current is flowing in the lower part of the circuit.

In State B of the circuit diagram of FIG. 2B, V+ has been disconnected from the positive plate of C1 and the other plate of C1 is connected to ground through S2. This illustrates a typical situation where the stored load of the C1 cap is being used through the S1 switch to power a load.

In States C and D of the circuit diagram of FIG. 2C, two states are shown where the C1 storage capacitor is not being charged or discharged. However, due to the leakage current from one plate to another, there is a current flowing through the non-ideal C1 component to C2 through the S2 switch (315). This current will charge C2 to some voltage at a rate based on the relative capacitances of C1 and C2 and the rate of leakage (320). The switch S2 is disconnected from ground and connected to the input of C2 (315). While in State C, the C2 capacitor is charged to some predetermined voltage (V1). At that predetermined voltage, the comparator then disconnects C2 from C1's open "Vss" plate using S2, and then subsequently connects the positive plate of C2 to the input of T1 transformer using S3, as shown in State D of FIG. 2D (325). This discharge current through T1 induces a voltage on the secondary of T1 that rises to a voltage value sufficient to return some of the charge to C1 through the diode D1 (325). Once the discharge of C2 is complete as determined by the comparator's determination of voltage on the positive plate of C2, the comparator returns all the switches to State C unless a demand is made to charge or discharge C1.

In the above-described operation, a relative "leaky" capacitor can return some of the charge loss through the C1's leakage when C1 is not in use during either a charge or discharge period of time. Due to the efficiency of the circuit (which can be made to be >90% efficiency), the leakage from the C1 device is effectively reduced by a factor of 10.times. For production of a large array of capacitors, this can be a significant improvement in yield. Often there are unwanted impurities in the material that increase the leakage current, and these are often not detected until the entire assembly has been completed. In a large array capacitor, this amounts to a significant number of good devices being rejected due to a relatively small number of failures in the array.

In one or more embodiments, energy storage is the intended use for this circuit, such that it is likely that relatively large periods of time will elapse between demands for energy charging or energy discharging. During those States (A & B), the recharge circuit cannot be used as described.

As can be seen from the foregoing description, the present method avoids the high temperature methods associated with prior high permittivity materials by the use of organic substrates to suspend and coat the high dielectric materials. High process temperatures are also avoided by the present methods. In addition, a new method for making high permittivity materials is disclosed and when used in conjunction with the high breakdown voltage materials (such as zein), a process for making a high dielectric capacitor with a high breakdown voltage character is made possible.

Due to the nature of the process, the procedure is rugged in terms of control of leakage current. The coating material is a general material that seems to coat any material, including contamination materials and it thus will thereby make manufacture of the device easier and with better yields. Since it is difficult to make most good high permittivity dielectrics pure enough to display low conductivity (and thus producing high leakage currents), the use of organic binders in a matrix of high permittivity material is desirable because the contact of a conductive contamination or a defective crystal that may have conductivity is prevented by the coating of organic substrate.

Figure 4:
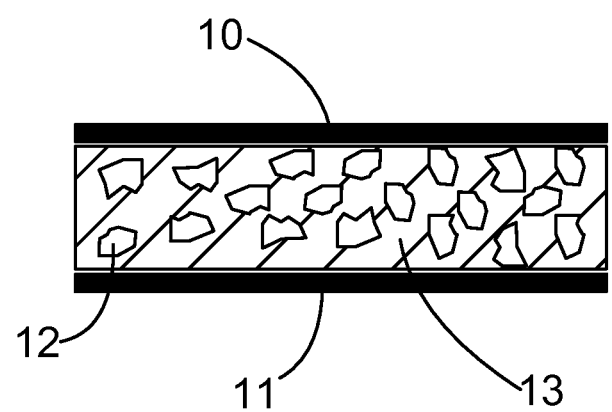
FIG. 4 is a cross-sectional view of a high permittivity low leakage capacitor, according to an embodiment of the present disclosure.

FIG. 4 is a cross-sectional view of a high permittivity low leakage capacitor, according to an embodiment of the present disclosure. As illustrated, the capacitor electrode 10 and its opposite polarity electrode 11 are spaced apart approximately equally. In the intervening space are heterogeneous dielectric materials 12 and 13. In one embodiment, a dielectric material may be formed from existing materials such as barium titanate or other such known high dielectrics, with an insulation material 13 such as zein, shellac, crosslinked silicones, or other such materials, to fill the intervening spaces between the high dielectric material 12. Due to the improvements of this invention, a low temperature process using the insulation dielectric 13 can incorporate relatively low temperature stability and melting materials.

The methods described herein provide a unique approach for making high permittivity capacitors without having to resort to standard high temperature manufacturing methods that almost no organic compound can withstand. This new approach vastly expands the materials by which these capacitors can be made, and increases the performance of the capacitors due to the reduced leakage currents that many organic polymers can display.

In one or more embodiments, Gd, Sr, Sn and Fe may be utilized as high permittivity dielectrics. In one or more embodiments, shellac, zein and silicon oil may be used as high voltage breakdown adjuvants. In other embodiments, other dielectrics and some breakdown voltage enhancers (adjuvants) may be utilized, such as but not limited to Y, Ni, Sm, Sc, Tb, Yb, La, Te, Ti, Zr, Ge, Mg, Pb, Hf, Cu, Ta, Nb, Bi.

Additionally an electronic circuit is shown wherein the leakage current for the device when in the unused and stored state can be "feed back" into the voltage charge of the primary energy storage unit. This will extend the life of the charge in the capacitor and also increase the yield from the manufacturing process.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising: recovering and regenerating a leakage current from a first capacitor having a first electrode and a second electrode, by
    applying a voltage to the first capacitor through a first switch selectively connected to a charging voltage and the second electrode of the first capacitor;
    storing charge corresponding to the applied voltage in the first capacitor;
    controlling a second switch to allow a leakage current to flow from the first capacitor to a second capacitor, the second switch being selectively connected to the second electrode of the first capacitor and to the second capacitor;
    storing charge corresponding to the leakage current of the first capacitor in the second capacitor; and
    controlling a third switch to allow charge from the second capacitor that corresponds to the leakage current of the first capacitor to flow back to the first capacitor to increase the efficiency and enhance the performance of the first capacitor.

2. The method of claim 1, wherein the second capacitor has a lower leakage current than the leakage current of the first capacitor.

3. The method of claim 1, further comprising selectively controlling the second switch to allow a leakage current to flow from the first capacitor to the second capacitor when the first capacitor is not being charged or discharged.

4. The method of claim 3, further comprising comparing the charge stored in the second capacitor against a predetermined voltage and disconnecting the second switch to cause the second capacitor to discharge its stored charge once the stored charge reaches the predetermined voltage.

5. The method of claim 4, further comprising allowing the current produced by the discharge of the second capacitor to pass through a transformer coupled between the first capacitor and the second capacitor by the third switch, thereby inducing a voltage in the transformer and increasing the induced voltage to a value sufficient to deliver charge back to the first capacitor.

6. A storage device comprising:
   a first capacitor having a first electrode and a second electrode, wherein the first capacitor possesses a leakage current when the first capacitor is not being charged or discharged;
   a first switch capable of selective connecting or disconnecting the first electrode of the first capacitor to a charging voltage;
   a second capacitor, electrically coupled to the first capacitor, wherein the second capacitor is capable of collecting the leakage current from the first capacitor;
   a second switch electrically connected to the second electrode of the first capacitor and to the second capacitor, the second switch capable of selectively controlling the flow of the leakage current from the first capacitor to the second capacitor when the first capacitor is not being charged or discharged, wherein a charge can be stored in the second capacitor corresponding to the leakage current received from the first capacitor; and
   a third switch capable of selectively delivering current produced from a discharge of the second capacitor back to the first capacitor to increase the efficiency and enhance the performance of the first capacitor.

7. The storage device of claim 6, wherein the second switch is capable of selectively connecting the first capacitor to a ground when the first capacitor is disconnected from the charging voltage by the first switch.

8. The storage device of claim 6, further comprising a transformer coupled between the first capacitor and the second capacitor by the third switch, the transformer capable of receiving the current discharged from the second capacitor and capable of producing an output voltage sufficient to deliver charge back to the first capacitor, thereby transmitting a certain fraction of the leakage current output by the first capacitor back to the first capacitor, through the second capacitor and the transformer.

9. The storage device of claim 8, further comprising a diode positioned between the transformer and the first capacitor.

10. The storage device of claim 6 further comprising a comparator capable of comparing the charge stored in the second capacitor against a predetermined voltage and causing the second capacitor to discharge its stored charge once the stored charge reaches the predetermined voltage.

11. The storage device of claim 6, wherein the second capacitor has a lower leakage current than the leakage current of the first capacitor.

12. The storage device of claim 6, wherein the first capacitor further comprises a solid-state, high permittivity material between the first and second electrodes, the high permittivity material being a mixture of an organic polymer and inorganic salt including a boron compound wherein the inorganic salt is sodium borohydride ($NaBH_4$), borax, or a mixture thereof.

* * * * *